(12) United States Patent
Inokuchi (10) Patent No.: US 9,557,710 B2
(45) Date of Patent: Jan. 31, 2017

(54) HOLOGRAM TRANSFER FOIL, FABRICATION METHOD OF IMAGE DISPLAY ELEMENT, IMAGE DISPLAY ELEMENT, AND PERSONAL AUTHENTICATION MEDIUM

(71) Applicant: TOPPAN PRINTING CO., LTD., Tokyo (JP)

(72) Inventor: Masami Inokuchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/518,368

(22) Filed: Oct. 20, 2014

(65) Prior Publication Data

US 2015/0036198 A1 Feb. 5, 2015

Related U.S. Application Data

(63) Continuation of application No. PCT/JP2013/061825, filed on Apr. 23, 2013.

(30) Foreign Application Priority Data

Apr. 25, 2012 (JP) .................................. 2012-099972

(51) Int. Cl.
*G03H 1/00* (2006.01)
*G03H 1/02* (2006.01)
(Continued)

(52) U.S. Cl.
CPC ............ *G03H 1/0011* (2013.01); *B42D 25/00* (2014.10); *B42D 25/328* (2014.10); *B44C 1/17* (2013.01);
(Continued)

(58) Field of Classification Search
CPC .. G03H 1/0011; G03H 1/0252; G03H 1/0256; G03H 1/0244; G03H 1/265; G03H 2001/0016; G03H 2001/0027; G03H 2001/0497; G03H 2210/54; G03H 2240/21; G03H 2250/10; G03H 2270/23; G03H 1/0276; G03H 2250/35; B42D 25/00; B42D 25/328; B42D 25/324; B42D 15/085; B42D 25/22–25/24; B42D 25/29–25/30; B42D 25/309; B42D 25/40; B42D 2033/00; B42D 2033/20; B42D 2035/44; B44C 1/16–1/17; G02B 5/18; G02B 5/1842; G02B 5/1861; G02B 5/1847; G02B 5/1857; G02B 5/188; G02B 5/32; G02B 2005/1804; G09F 3/0292; B32B 37/025; B32B 37/26; G06F 21/31; G07D 7/0013
(Continued)

(56) References Cited

U.S. PATENT DOCUMENTS

2008/0272883 A1 11/2008 Toda et al.
2012/0127547 A1 5/2012 Gocho et al.
2012/0194884 A1 8/2012 Shinoda et al.

FOREIGN PATENT DOCUMENTS

EP 0 077 801 B1 9/1987
EP 0 778 801 A1 6/1997
(Continued)

OTHER PUBLICATIONS

Extended European Search Report dated Feb. 4, 2015 in corresponding European Patent Application No. 13782378.7.
(Continued)

*Primary Examiner* — Scott J Sugarman
*Assistant Examiner* — Ibrahima Diedhiou (57) ABSTRACT

A hologram transfer foil according to an embodiment is thermally transferrable to a transfer base member. The hologram transfer foil has a structure configured such that a peeling layer, a diffraction structure forming layer and an
(Continued)

adhesive layer are stacked on one surface of a substrate. the diffraction structure forming layer includes fine concaves and convexes of a hologram or a diffraction grating. At least one of the peeling layer and the adhesive layer includes heat-conductive hidden information in a heat-conductive hidden information possession portion.

9 Claims, 6 Drawing Sheets

(51) Int. Cl.
*B42D 25/328* (2014.01)
*B42D 25/00* (2014.01)
*B44C 1/17* (2006.01)
*G03H 1/26* (2006.01)
*G03H 1/04* (2006.01)

(52) U.S. Cl.
CPC .......... *G03H 1/0252* (2013.01); *G03H 1/0256* (2013.01); *G03H 1/0244* (2013.01); *G03H 1/265* (2013.01); *G03H 2001/0016* (2013.01); *G03H 2001/0027* (2013.01); *G03H 2001/0497* (2013.01); *G03H 2210/54* (2013.01); *G03H 2240/21* (2013.01); *G03H 2250/10* (2013.01); *G03H 2270/23* (2013.01)

(58) Field of Classification Search
USPC .... 359/2, 572, 558, 566, 575, 576; 156/230; 340/5.8, 5.86, 815.65; 283/72, 86, 93, 114, 283/112; 355/2
See application file for complete search history.

(56) References Cited

FOREIGN PATENT DOCUMENTS

| | | |
|---|---|---|
| JP | 08076674 A * | 3/1996 |
| JP | 2000-141863 | 5/2000 |
| JP | 2002-226740 | 8/2002 |
| JP | 2002-293068 | 10/2002 |
| JP | 2003-170685 | 6/2003 |
| JP | 2010-253829 | 11/2010 |
| JP | 2011-221228 | 11/2011 |
| JP | 2012-68537 | 4/2012 |
| JP | 2012-71477 | 4/2012 |
| JP | 2012-76362 | 4/2012 |

OTHER PUBLICATIONS

International Preliminary Report on Patentability issued Oct. 28, 2014 in corresponding International Patent Application No. PCT/JP2013/061825.
International Search Report mailed Aug. 13, 2013, in corresponding International Patent Application No. PCT/JP2013/061825.

* cited by examiner

HOLOGRAM TRANSFER FOIL, FABRICATION METHOD OF IMAGE DISPLAY ELEMENT, IMAGE DISPLAY ELEMENT, AND PERSONAL AUTHENTICATION MEDIUM

CROSS-REFERENCE TO RELATED APPLICATIONS

This application is Continuation Application of PCT Application No. PCT/JP2013/061825, filed Apr. 23, 2013 and based upon and claiming the benefit of priority from the Japanese Patent Application No. 2012-099972, filed Apr. 25, 2012, the entire contents of all of which are incorporated herein by reference.

BACKGROUND OF THE INVENTION

1. Field of the Invention

Embodiments described herein relate generally to a hologram transfer foil which is easy to identify and difficult to counterfeit and tamper, a fabrication method of an image display element, an image display element, and a personal authentication medium.

2. Description of the Related Art

In most of personal identification media such as passports or ID (identification) cards, face images are used in order that personal authentication can be visually performed. For example, in a general passport, printing paper on which a face image is printed is attached to a booklet. However, there is a concern that such a passport is tampered by re-attaching a photoprint.

For this reason, in recent years, the information of a face image is digitized, and the digital information is reproduced on the booklet. As an image display technique which is used for image reproduction, use is made of, for example, a thermal transfer recording method by a transfer ribbon using a sublimation (thermal migratory) dye, or a resin melting type or wax melting type in which pigments are dispersed, or an electrophotography technique.

In recent years, printers by a thermal transfer recording method using a sublimation dye or a colored thermoplastic resin have been gaining in popularity. If this thermal transfer recording method is used, it is not necessarily difficult to remove a face image from a passport and to record another face image on the corresponding part.

On the other hand, there has been proposed a fluorescent printed matter on which a face image is printed by using the above-described image display technique and a face image is recorded thereon by using fluorescent ink (see, e.g. literature 1 (Jpn. Pat. Appin. KOKAI Publication No. 2000-141863)). In addition, there have been proposed an anti-counterfeit image formation element on which a face image is recorded by using ink which contains a colorless or thin-color fluorescent dye and a color pigment (e.g. literature 2 (Jpn. Pat. Appin. KOKAI Publication No. 2002-226740)), and a personal authentication medium on which an ordinary face image and a face image, which is formed by using a pearl pigment are disposed in juxtaposition (see, e.g. literature 3 (Jpn. Pat. Appin. KOKAI Publication No. 2003-170685)).

By applying the above-described image display techniques to passports, tampering of passports becomes more difficult.

However, a face image, which is recorded by using a fluorescent material, cannot be observed unless a special light source, such as an ultraviolet lamp, is used. In addition, although a face image, which is formed by using a pearl pigment, can be recognized by the naked eye, it is difficult to form an image with high fineness by using the pearl pigment since the grain size of the pearl pigment is large.

Tampering of a face is easier in a case where the look of a face image recorded on a personal authentication medium is simple and there is no special visual effect, than in a case where a face image is complex and has a characteristic visual effect. In addition, in a case where a face image is displayed with a simple look, it is difficult to visually determine with ease a counterfeited or tampered face image.

BRIEF SUMMARY OF THE INVENTION

The present invention has been made in consideration of the above circumstance, and the object of the invention is to provide a hologram transfer foil which is easy to identify and difficult to counterfeit and tamper, a fabrication method of an image display element, an image display element, and a personal authentication medium.

A hologram transfer foil according to first embodiment is thermally transferrable to a transfer base member. The hologram transfer foil includes a structure configured such that a peeling layer, a diffraction structure forming layer and an adhesive layer are stacked on one surface of a substrate. The diffraction structure forming layer includes fine concaves and convexes of a hologram or a diffraction grating. At least one of the peeling layer and the adhesive layer includes heat-conductive hidden information in a heat-conductive hidden information possession portion.

According to the first embodiment, the heat-conductive hidden information may be a geometrical pattern, a cyclically arranged two-value character pattern, or a cyclically arranged two-value graphic pattern. At least one of the peeling layer and the adhesive layer may record the heat-conductive hidden information in the heat-conductive hidden information possession portion by forming concaves and convexes. The heat-conductive hidden information may be recorded in the heat-conductive hidden information possession portion by an agglomeration state of an inclusion in the adhesive layer.

According to second embodiment, a hologram transfer foil is thermally transferrable to a transfer base member. The hologram transfer foil includes a structure configured such that a peeling layer, a diffraction structure forming layer and an adhesive layer are stacked on one surface of a substrate. The diffraction structure forming layer includes fine concaves and convexes of a hologram or a diffraction grating. At least one of the peeling layer and the adhesive layer includes heat-conductive hidden information in a heat-conductive hidden information possession portion, and includes no hidden information in a heat-conductive hidden information non-possession portion.

According to the second embodiment, the diffraction structure forming layer may be configured such that at least one of a spatial frequency and a grating angle is different between the heat-conductive hidden information possession portion and the heat-conductive hidden information non-possession portion.

According to third embodiment, in a fabrication method of an image display element, the hologram transfer foil of the second embodiment is thermally transferred to the transfer base member. The fabrication method of an image display element includes transferring the heat-conductive hidden information possession portion of the hologram transfer foil onto the transfer base member, transferring the heat-conductive hidden information non-possession portion of the hologram transfer foil onto the transfer base member, the heat-conductive hidden information non-possession portion including identification information.

According to forth embodiment, the image display element is fabricated by the fabrication method of the third embodiment. The image display element includes a structure configured such that an image receiving layer, an adhesive layer, a diffraction structure forming layer and a peeling layer are stacked on one surface of a substrate.

According to fifth embodiment, a personal authentication medium comprises the image display element of the forth embodiment.

According to the embodiments of the present invention, it is possible to provide a hologram transfer foil which is easy to identify and difficult to counterfeit and tamper, a fabrication method of an image display element, an image display element, and a personal authentication medium.

DETAILED DESCRIPTION OF THE INVENTION

Embodiments relate to a hologram transfer foil, an image display element, a fabrication method of an image display element, and a personal authentication medium.

A hologram transfer foil according to an embodiment is formed by stacking a peeling layer, a diffraction structure forming layer and an adhesive layer on one surface of a substrate. The diffraction structure forming layer is formed of fine concaves and convexes of a hologram or a diffraction grating. In at least one of the peeling layer and the adhesive layer, hidden information is included in a heat-conductive hidden information possession portion, and no hidden information is included in a heat-conductive hidden information non-possession portion.

An image display element according to an embodiment is fabricated by thermally transferring a hologram transfer foil onto a transfer base member.

A fabrication method of an image display element according to an embodiment includes recording a heat-conductive hidden information possession portion of a hologram transfer foil on a transfer base member, and recording a heat-conductive hidden information non-possession portion including identification information of the hologram transfer foil on the transfer base member.

According to the embodiment, it is possible to visually confirm with ease an image for identifying a person, to prevent counterfeiting and tampering, and to realize high security.

Next, embodiments will be described in detail with reference to the drawings.

Figure 1:
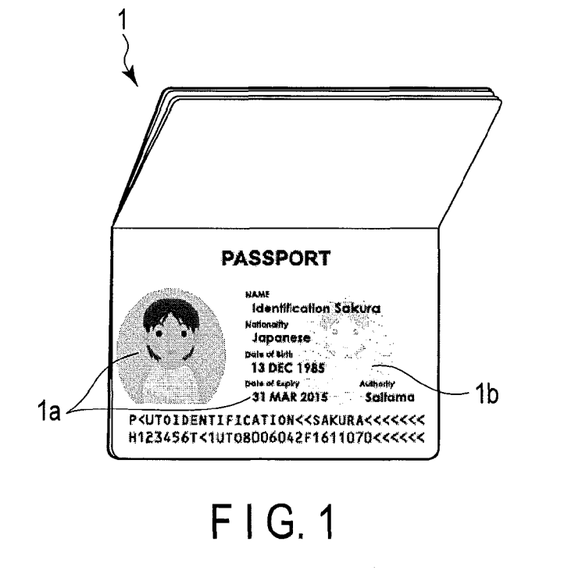
FIG. 1 is a plan view illustrating an example of a personal authentication medium according to an embodiment.

FIG. 1 is a plan view which schematically illustrates an example of a personal authentication medium according to an embodiment. A personal authentication medium 1 is, for example, a booklet such as a passport. In FIG. 1, the personal authentication medium 1 is depicted in an open state.

The personal authentication medium 1 displays image information 1a, 1b. The image information 1a is image information which is displayed by making use of absorption of light. Specifically, the image information 1a is an image which is visually recognizable when the image information 1a is illuminated with white light and observed by the naked eye.

The image information 1a may be composed of, for example, a dye or a pigment. In this case, in the formation of the image information 1a, use may be made of a thermal transfer recording method using a thermal head, an ink jet recording method, an electrophotography method, or a combination of two or more of these methods. The image information 1a may be formed by forming a layer including a thermosensitive color coupler, and drawing an image on this layer by a laser beam. The image information 1a may be formed by combining the above-described various methods. At least a part of the image information 1a may be formed by a thermal transfer recording method using a hot stamp, may be formed by a printing method, or may be formed by using a combination of these.

The image information 1b is an image which is displayed by a diffraction structure of a hologram and/or a diffraction grating. For example, the image information 1b is formed by successively performing, in the named order, thermal transfer recording using a thermal head and thermal transfer recording using a hot stamp or a heat roll.

The image information 1b includes identification information with an intermediate gradation for authenticating a person, and hidden information which is recognized at a visual recognition angle which is different from a visual recognition angle of the identification information. The identification information with the intermediate gradation for personal authentication is, for instance, a face image. The hidden information is, for example, non-personal information such as a symbol, a code and a mark.

Figure 2:
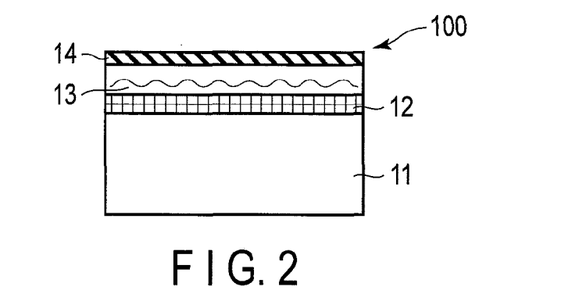
FIG. 2 is a cross-sectional view illustrating a first example of a hologram transfer foil according to the embodiment.
Figure 3:
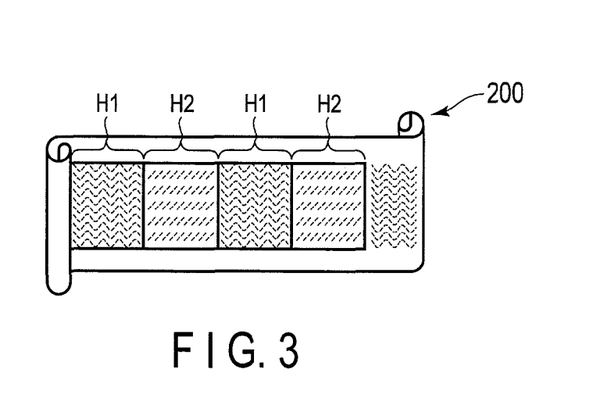
FIG. 3 is a plan view illustrating a second example of the hologram transfer foil according to the embodiment.
Figure 4:
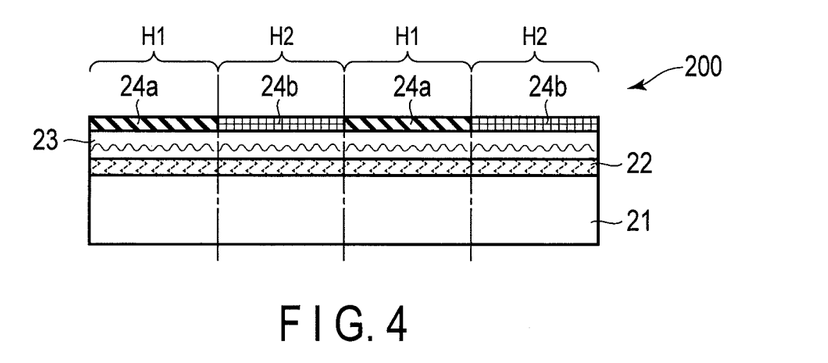
FIG. 4 is a cross-sectional view illustrating the second example of the hologram transfer foil according to the embodiment.

Next, referring to FIG. 2 to FIG. 4, a description is given of the structure of a hologram transfer foil which is necessary for the fabrication of the personal authentication medium 1.

FIG. 2 is a cross-sectional view illustrating a first example of the hologram transfer foil according to the embodiment.

FIG. 3 is a plan view illustrating a second example of the hologram transfer foil according to the embodiment.

Figure 5:
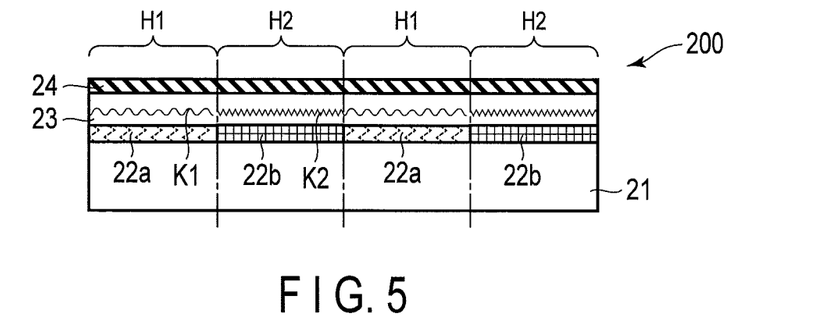
FIG. 5 is a cross-sectional view illustrating the second example of the hologram transfer foil according to the embodiment.

FIG. 4 and FIG. 5 are cross-sectional views illustrating the second example of the hologram transfer foil according to the embodiment.

A hologram transfer foil 100, 200 is formed by successively stacking a peeling layer 12, 22 (22a, 22b), a diffraction structure forming layer 13, 23, and an adhesive layer 14, 24 (24a, 24b) on one surface of a substrate 11, 21. This hologram transfer foil 100, 200 may be applied in the form of a hologram ribbon or sheet.

The peeling layer 22a is a peeling layer including no hidden information. The peeling layer 22b is a peeling layer including hidden information.

The adhesive layer 24a is an adhesive layer including no hidden information. The adhesive layer 24b is an adhesive layer including hidden information.

The substrate 11, 21 is, for example, a resin film or sheet. The substrate 11, 21 is formed by using, for example, a plastic material such as polyethylene terephthalate (PET), polyprophylene (PP), polycarbonate (PC), polymethylmethacrylate (PMMA), or polyethylene (PE).

The peeling layer 12, 22 is formed on the substrate 11, 21. The peeling layer 12, 22 functions to stabilize peeling of the hologram transfer foil 100, 200 from the substrate 11, 21, and to promote adhesion to a transfer base member 301 shown in FIG. 6 (to be described later). The peeling layer 12, 22 has light transmissivity, and is typically transparent. As the material of the peeling layer 12, 22, use may be made of, for instance, a resin in which a silicone- or fluorine-based additive is added to a thermoplastic resin such as a polycarbonate resin, an acrylic resin, a fluorine-based acrylic resin, a silicone-based acrylic resin, an epoxy acrylate resin, a polystyrene resin, a cycloolefin polymer, a methylstyrene resin, a fluorene resin, PET, polypropylene, a polyethylene terephthalate resin or a poyacetal resin, a fluorine-based acrylic resin, or a silicone-based acrylic resin.

The peeling layer 12, 22b is coated by, for example, a gravure coater. In the coating by the gravure coater, by using a plate with a pattern as a gravure printing plate, the peeling layer 12, 22b with a finely varying thickness along the pattern (typically, a difference in thickness is about 0.2 μm or less) can be coated. In addition, the peeling layer 22, 22a may be coated by a coating method of, for example, a lip coater, by which the thickness of a coated layer becomes uniform in the plane.

The diffraction structure forming layer 13, 23 is formed on the peeling layer 12, 22. As the material of the diffraction structure forming layer 13, 23, use may be made of, for example, a photo-curing resin such as a polycarbonate resin, an acrylic resin, a fluorine-based acrylic resin, a silicone-based acrylic resin, an epoxy acrylate resin, a polystyrene resin, a cycloolefin polymer, a methylstyrene resin, a fluorene resin, PET, polypropylene, In addition, as the material of the diffraction structure forming layer 13, 23, use may be made of a thermo-curing resin such as an acrylonitrile-styrene copolymer resin, phenol resin, melamine resin, a urea resin, or an alkyd resin. Furthermore, as the material of the diffraction structure forming layer 13, 23, use may be made of a thermoplastic resin such as a polypropylene resin, a polyethylene terephthalate resin or a poyacetal resin. For example, by curing the above resin in a desired structural shape, the diffraction structure forming layer 13, 23 is formed on the surface of the peeling layer 12, 22.

In the meantime, cured resins, of which the diffraction structure forming layer 13, 23 is formed, are all light-transmissive. The refractive index of the cured resin, of which the diffraction structure forming layer 13, 23 is formed, is generally about 1.5. In order to improve the heat resistance, foil cutting characteristic and thermal transfer characteristic, it is advantageous that the film thickness of the diffraction structure forming layer 13, 23 is smaller, and this film thickness should preferably be about 1.5 μm or less.

The diffraction structure forming layer 13, 23 includes a diffraction structure forming portion K1, K2 of a hologram and/or a diffraction grating. Parameters of this diffraction structure forming portion K1, K2 are:

(1) A spatial frequency of the diffraction structure (the pitch of grating lines per unit length), and (2) the direction of the diffraction structure (the direction of grating lines).

In accordance with the above (1), the color, in which the shining image cell is viewed, varies. In accordance with the above (2), the direction, in which the shining image cell is viewed, varies.

The diffraction structure forming portions K1, K2 may, or may not, have different parameters of the above (1) and (2). However, preferably, at least one of the parameters (1) and (2) is different.

The diffraction structure forming layer 13, 23 may include a reflective layer. In a case where the reflective layer is provided, the visibility of the image, which is displayed by the diffraction structure, is improved. As the reflective layer, for example, a transparent reflective layer may be used. The transparent reflective layer is formed by, for example, a vacuum film formation method such as vacuum evaporation or sputtering.

As the transparent reflective layer, for example, use is made of a layer including a transparent material with a refractive index which is different from the refractive index of the diffraction structure forming layer 13, 23. The transparent reflective layer including the transparent material may be of a single-layer structure or a multilayer structure. In the case of the multilayer structure, the transparent reflective layer may be designed such that reflection/interference occurs repeatedly. As the transparent material, use is made of, for example, a transparent dielectric material such as zinc sulfide or titanium dioxide.

In addition, as the transparent reflective layer, a metallic layer with a thickness of less than about 20 nm may be used. As the material of the metallic layer, use is made of, for instance, an elementary metal such as chromium, nickel, aluminum, iron, titanium, silver, gold or copper, or an alloy thereof. Preferably, the film thickness of the transparent reflective layer should be, typically, about 50 nm or more, and about 100 nm or less.

The adhesive layer 14, 24 is formed on the diffraction structure forming layer 13, 23. As the material of the adhesive layer 14, 24, use may be made of, for example, a thermoplastic resin such as a, polypropylene resin, a polyethylene terephthalate resin, a poyacetal resin or polyester resin, or a material obtained by adding inorganic fine particles of silica, etc. are added to these resins.

The adhesive layer 14, 24b is coated by, for example, a gravure coater. In the coating by the gravure coater, by using a plate with a pattern as a gravure printing plate, the adhesive layer 14, 24*b* with a slightly varying thickness along the pattern (typically, a difference in thickness is about 0.2 μm or less) can be coated. Alternatively, when inorganic fine particles are added to the material of the adhesive layer 14, 24*b*, the additive contained in the adhesive layer 14, 24*b* may be agglomerated along the pattern of the plate. Thereby, at a time of thermal transfer with the thermal head, the heat conductivity can be made different in accordance with the pattern of the plate.

The adhesive layer 24, 24*a* is coated by a coating method of, for example, a lip coater, by which the thickness of a coated layer and the state of contained inorganic fine particles become uniform in the plane.

Figure 6A:
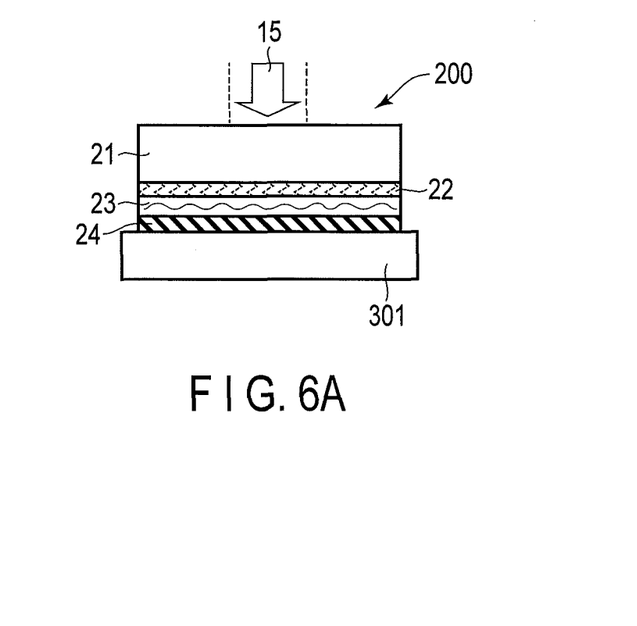
FIG. 6A is a cross-sectional view illustrating an example of a first step of a fabrication method of an image display element according to the embodiment.
Figure 6B:
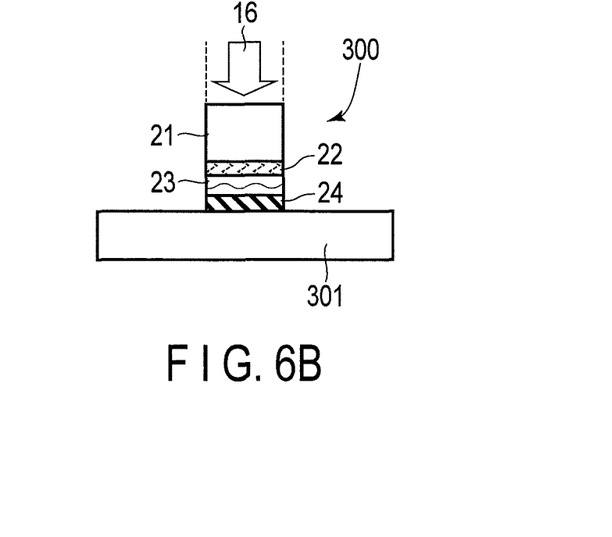
FIG. 6B is a cross-sectional view illustrating an example of a second step of the fabrication method of the image display element according to the embodiment.

FIG. 6A and FIG. 6B are cross-sectional views illustrating examples of a first step and a second step of a fabrication method of an image display element according to the embodiment. In FIG. 6A and FIG. 6B, an image display element 300 is fabricated by transferring the above-described hologram transfer foil 200 onto a transfer base member 301. However, the same fabrication method may be used in a case where the image display element is fabricated by the hologram transfer foil 100.

Figure 7:
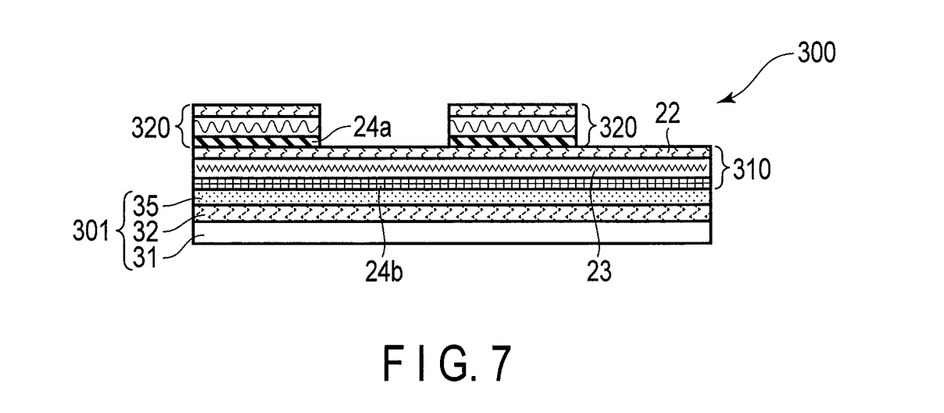
FIG. 7 is a cross-sectional view illustrating an example of an image display element fabricated by the fabrication method of the image display element according to the embodiment.

FIG. 7 is a cross-sectional view which schematically illustrates an example of the image display element 300 fabricated by the fabrication method illustrated in FIG. 6A and FIG. 6B.

When the image display element 300 shown in FIG. 7 is fabricated based on the above-described hologram transfer foil 200 shown in FIG. 3, the hologram transfer foil 200 is first disposed on a surface of the transfer base member 301, as illustrated in FIG. 6A, such that the substrate 21 of the hologram transfer foil 200 is located on the upper side, and the adhesive layer 24 is attached to the surface of the transfer base member 301. Next, a thermal pressure 15 is applied to the upper surface of the hologram transfer foil 200, between broken lines illustrated in FIG. 6A. Thereafter, the part, to which the thermal pressure 15 is not applied, is peeled from the transfer base member 301. Thereby, as illustrated in FIG. 6B, only that part 16 of the hologram transfer foil 200, to which the thermal pressure 15 is applied, is transferred to the surface of the transfer base member 301. Next, peeling occurs between the substrate 21 of the part 16, to which the thermal pressure 15 is applied, and the peeling layer 22. Thereby, an image display element 300, in which a part of the hologram transfer foil 200 has been transferred to a desired location on the surface of the transfer base member 301, is fabricated.

The transfer base member 301, to which the hologram transfer foil 100, 200 is transferred, includes a substrate 31, a peeling layer 32 and an image receiving layer 35. As the substrate 31, for example, the materials described as examples in connection with the substrate 11, 21 can be used. As the peeling layer 32, for example, the materials described as examples in connection with the peeling layer 12, 22, can be used. It is preferable that the image receiving layer 35 includes a material with good adhesion to the adhesive layer 14, 24 of the hologram transfer foil 100, 200.

Next, a description is given of the method of forming the image display element 300, which includes hidden information and identification information for personal authentication.

In the fabrication of the image display element 300, for example, a heat-conductive hidden information possession portion H2 is formed on the transfer base member 301. Specifically, the heat-conductive hidden information possession portion H2 of the hologram transfer foil 100, 200 is thermally transferred onto the image receiving layer 35 of the transfer base member 301. In this thermal transfer, for example, a thermal head is used. Incidentally, instead of the thermal transfer using the thermal head, thermal transfer using a heat roll or a hot stamp may be performed. The thermal transfer area of the heat-conductive hidden information possession portion H2 is set to be at least 10% or more of a transfer designation area. In addition, it is desirable that the transfer shape of the heat-conductive hidden information possession portion H2 be such a continuous shape that hidden information can be confirmed.

Next, identification information with an intermediate gradation for personal authentication is formed on the transfer base member 301. The identification information with the intermediate gradation for personal authentication is printed based on image electronic information which is obtained, for example, by photographing the face of a person with use of an image-pickup device, or by scanning a face image from a photographic print. For example, the identification information, such as a face image, corresponds to a heat-conductive hidden information non-possession portion H1. In the heat-conductive hidden information non-possession portion H1, the identification information is formed on the transfer base member 301. Specifically, based on image information, a transfer layer 320 in the heat-conductive hidden information non-possession portion H1 in the hologram transfer foil 200 shown in FIG. 3 is thermally transferred onto the image receiving layer 35 shown in FIG. 7 and/or a transfer layer 310 in the heat-conductive hidden information possession portion H2. This thermal transfer is executed by using the thermal head, such that the part, which is thermally transferred from the hologram transfer foil 200 to the image receiving layer 35, has a gradation and a pattern corresponding to the above-described image. In the meantime, in this case, it is assumed that the above-described parameters are different between the diffraction structure forming portion K1 of the heat-conductive hidden information non-possession portion H1 and the diffraction structure forming portion K2 of the heat-conductive hidden information possession portion H2 on which the thermal transfer was previously executed.

Since the thus obtained pattern corresponding to the face image is formed by the thermal transfer using the thermal head, the pattern is typically formed by a plurality of dot shapes or line shapes.

The diameter of the dot-shaped portion or the line width of the line-shaped portion is within a range of, for example, about 0.085 mm or more and 0.508 mm or less (about 50 dpi (dots per inch) or more, and about 300 dpi or less), and typically within a range of about 0.085 mm or more and 0.169 mm or less (about 150 dpi or more, and about 300 dpi or less). If the diameter of the dot-shaped portion or the dimension of the line width of the line-shaped portion is increased, it becomes difficult to display a face image with high fineness. In addition, if the diameter of the dot-shaped portion or the dimension of the line width of the line-shaped portion is decreased, the reproducibility of the diameter of the dot-shaped portion or the line width of the line-shaped portion deteriorates.

Incidentally, in the fabrication of the image display element 300, the identification information with the intermediate gradation for personal authentication may be first formed, and subsequently the heat-conductive hidden information possession portion H2 may be formed.

In the image display element 300, the heat-conductive hidden information possession portion H2 holds, for example, hidden information. The hidden information may be, for example, a cyclically arranged two-value character/ graphic pattern, or a guilloche pattern. Accordingly, it is easy to distinguish the hidden information and the identification information with the intermediate gradation for personal authentication.

The image display element 300 is printed/rendered, as a face image or a fingerprint which is a key for personal identification, on a booklet such as a passport or a visa, or a personal authentication medium such as a card.

In the present embodiment, for example, personal identification information, such as the face of an authentic owner, is formed by combining a structure body provided with a diffraction structure, and an on-demand printing technique, and furthermore hidden information having a light emission angle, which is different from a light emission angle of the identification information, is formed.

An observer (examiner), who performs personal authentication, can easily perform the personal authentication by viewing the image display element 300, and can easily disclose counterfeiting or tampering. In addition, it is difficult to counterfeit or tamper with the image display element 300.

Figure 8:
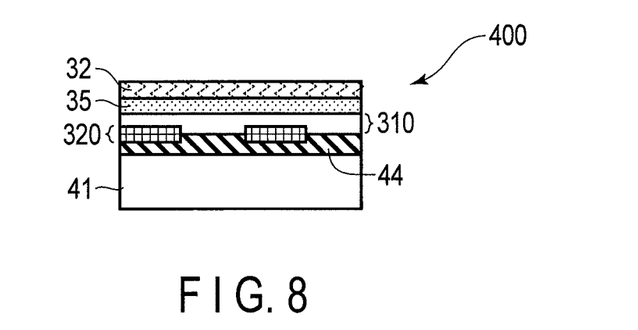
FIG. 8 is a cross-sectional view illustrating an example of a personal authentication medium on which the image display element according to the embodiment has been transferred.

Next, referring to FIG. 8, a description is given of a personal authentication medium which is fabricated by thermally transferring the image display element 300.

FIG. 8 is a cross-sectional view which schematically illustrates an example of a personal authentication medium 400 which is fabricated such that the image display element 300 shown in FIG. 7 is thermally transferred.

The personal authentication medium 400 is obtained by thermally transferring the image display element 300 shown in FIG. 7 from the substrate 31 onto a base member 41. In this thermal transfer, for example, a hot stamp is used. Incidentally, instead of the thermal transfer using the hot stamp, thermal transfer using a heat roll or a thermal head may be performed. In the above-described manner, the personal authentication medium 400 is fabricated.

Figure 9:
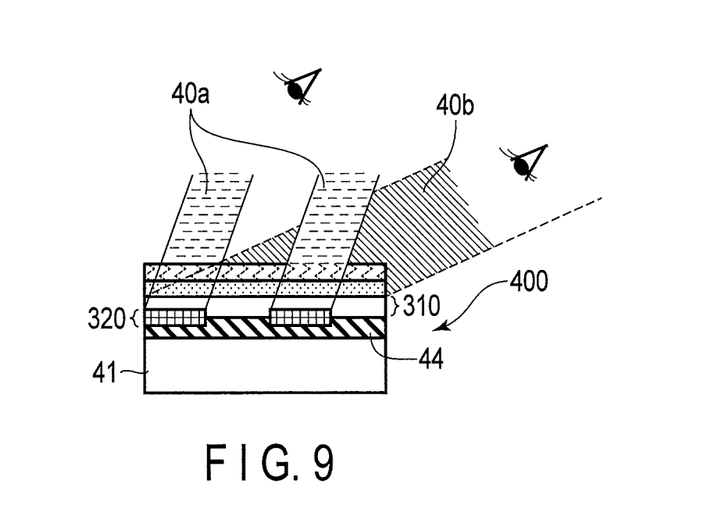
FIG. 9 is a cross-sectional view illustrating an example of an observation state of the personal authentication medium according to the embodiment.
Figure 10A:
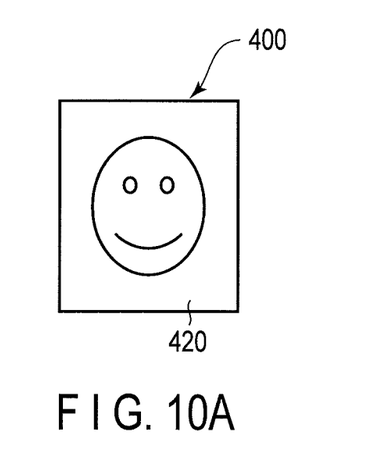
FIG. 10A is a plan view illustrating an example of identification information of the personal authentication medium according to the embodiment.

If the personal authentication medium 400 fabricated in this manner is observed from an observation range 40a shown in FIG. 9, identification information (face image) 420, shown in FIG. 10A, which has an intermediate gradation for personal authentication, is observed by the observer.

Figure 10B:
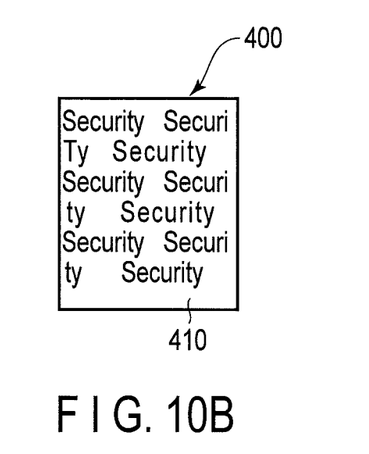
FIG. 10B is a plan view illustrating an example of hidden information of the personal authentication medium according to the embodiment.

If the personal authentication medium 400 is observed from an observation range 40b shown in FIG. 9, diffraction light of the identification information 420, which has an intermediate gradation for personal authentication, is not observed by the observer, and, instead, hidden information 410 shown in FIG. 10B is observed by the observer.

An adhesive anchor layer for enhancing the strength of adhesion may be formed on the base member 41.

In a case where it is difficult to attach the personal authentication medium 400 to the base member 41 with strong adhesive force, the personal authentication medium 400 may be thermally transferred to the base member 41 via an adhesive layer 44, as illustrated in FIG. 8 and FIG. 9. For example, an adhesive ribbon is used as the adhesive layer 44. The adhesive force between the personal authentication medium 400 and the base member 41 can be increased by the provision of the adhesive layer 44.

The material of the base member 41, to which the image display element 300 is attached, may be other than paper. For example, the base member 41, to which the image display element 300 is attached, may be a plastic substrate, a metallic substrate, a ceramic substrate, or a glass substrate.

Figure 11:
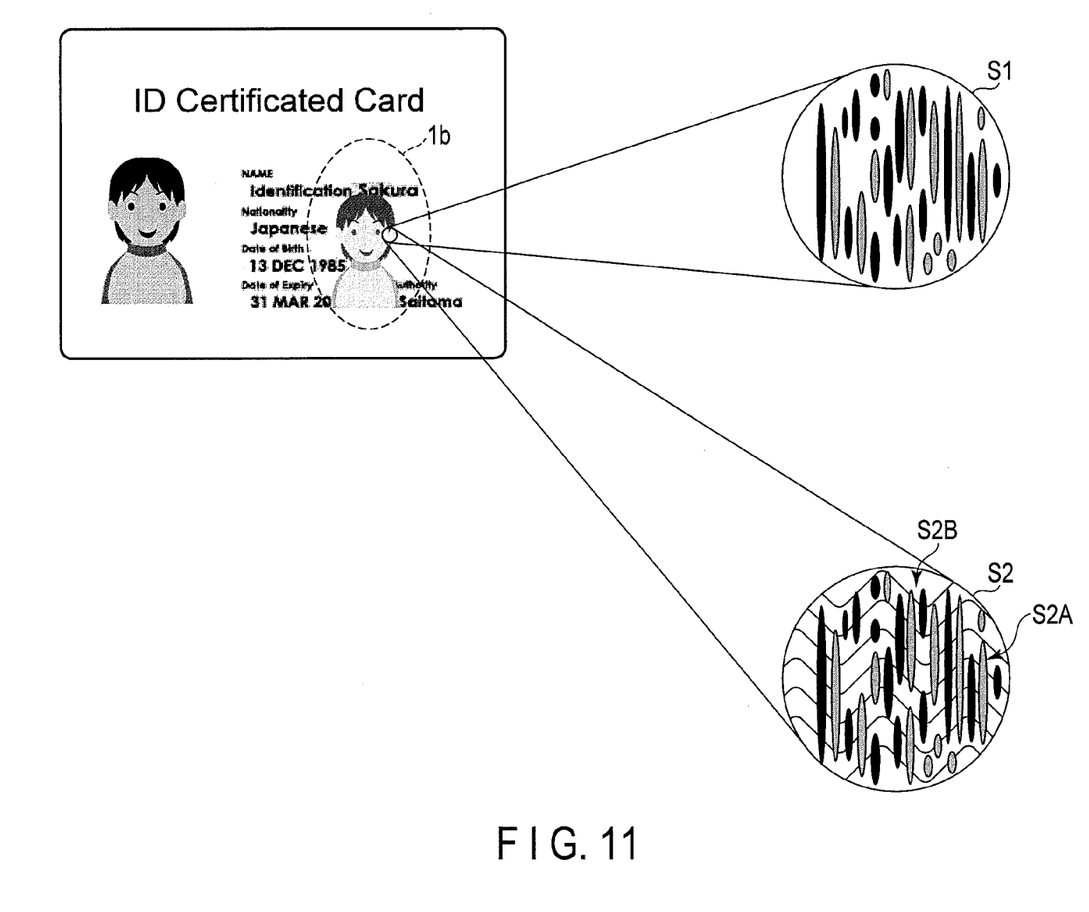
FIG. 11 is a schematic view illustrating an example of comparison between a conventional image and an image according to the embodiment.

FIG. 11 is a schematic view illustrating an example of comparison between a conventional image and an image according to the embodiment.

A conventional image S1 is a hologram which is fabricated by transferring an image corresponding to the density of an image onto a conventional hologram transfer foil by a thermal head.

An image S2 according to the embodiment includes identification information S2 A which displays a face image, and hidden information S2 B by, e.g. concaves and convexes (a guilloche pattern in the example of FIG. 11).

In the present embodiment, when the pixels of the identification information S2 A are transferred in accordance with the density of the image, the hidden information S2 B is formed at the same time. Conventionally, the hidden information S2 B is not formed. Therefore, in the embodiment, a counterfeit can be discriminated, and tampering can be prevented.

The advantageous effects of the above-described embodiment will be described below.

In the present embodiment, it is possible to express an image which is hardly used for tampering and disguising, and has a characteristic visual effect with good image quality.

In the embodiment, authenticity determination can easily visually be performed.

In the embodiment, hidden information can be confirmed by observation from a specific range, and the hidden information cannot be confirmed in a range different from the specific range. Therefore, authenticity determination is easy for the image display element 300 which is fabricated by transferring the hologram transfer foil 100, 200 onto the transfer base member 301.

In the embodiment, diffraction light is emitted from the heat-conductive hidden information possession portion H2 and heat-conductive hidden information non-possession portion H1 under a specific illumination condition, the image of the hidden information can be confirmed in the heat-conductive hidden information possession portion H2, and the image of the hidden information cannot be confirmed in the heat-conductive hidden information non-possession portion H1.

In the embodiment, the spatial frequency and/or grating angle of the hologram layer is different between the heat-conductive hidden information possession portion H2 and heat-conductive hidden information non-possession portion H1. Thereby, diffraction light can be emitted from only the heat-conductive hidden information possession portion H2 under a specific illumination condition. As a result, the observer can confirm the image of the hidden information under the specific illumination condition. On the other hand, diffraction light can be emitted from only the heat-conductive hidden information non-possession portion H1 under an illumination condition other than the specific illumination condition. Under the other illumination condition, no diffraction light is emitted from the heat-conductive hidden information possession portion H2. As a result, the observer cannot confirm the image of the hidden information under the other illumination condition.

In the embodiment, under the other illumination condition in the case where diffraction light is emitted from the heat-conductive hidden information non-possession portion H1, the observer can observe the identification information for personal authentication. On the other hand, under the specific illumination condition in the case where diffraction light is emitted from the heat-conductive hidden information possession portion H2, the observer can observe the image of the hidden information. By making the spatial frequency and/or grating angle of the hologram layer different between the heat-conductive hidden information non-possession portion H1 and the heat-conductive hidden information possession portion H2, it is possible to make different the observation angle of the identification information 420 for personal authentication and the observation angle at which the image of the hidden information 410 is confirmed. As a result, when the identification information 420 for personal authentication is observed, it becomes possible to prevent the image of the hidden information 410 from being observed together.

EXAMPLES

A concrete example of the fabrication of the image display element 300 will be described below.

To begin with, a first hologram transfer foil (for example, the hologram transfer foil 100 shown in FIG. 2) is fabricated.

As a substrate 11, a polyethylene terephthalate film with a thickness of about 12 μm is prepared. A peeling layer 12 and a diffraction structure forming layer 13 are formed in the named order on the substrate 11 by using a gravure coater. A multilayer structure of the substrate 11, peeling layer 12 and diffraction structure forming layer 13 is dried in an oven. Incidentally, as a plate of the gravure coater, use is made of a plate on which a guilloche pattern of 175 lines/mm is applied. In addition, as the material of the peeling layer 12, an acrylic resin is used. As the material of the diffraction structure forming layer 13, acrylpolyol is used. The film thicknesses of the dried peeling layer 12 and diffraction structure forming layer 13 are about 0.6 μm and 0.7 μm, respectively.

Next, a diffraction structure serving as a hologram is formed on the surface of the diffraction structure forming layer 13 by thermal press using a roll emboss device. The depth of the formed diffraction structure is about 100 nm. The spatial frequency is about 2000/mm.

Next, a transparent reflective layer containing zinc sulfide is formed by evaporation-deposition on the diffraction structure of the diffraction structure forming layer 13. The film thickness of the transparent reflective layer is about 50 nm.

Under the above-described conditions, a first hologram transfer foil including hidden information is fabricated.

Next, a second hologram transfer foil, which includes substantially the same structure and material as the first hologram transfer foil but does not include hidden information, is fabricated. In the fabrication of this second hologram transfer foil, a peeling layer 12 is formed by using a lip coater and is dried in an oven. The film thicknesses of the dried peeling layer 12 and diffraction structure forming layer 13 are about 0.6 μm and 0.7 μm, respectively. Next, a diffraction structure serving as a hologram with a depth of about 100 nm and a spatial frequency of about 1000/mm is formed on the surface of the diffraction structure forming layer 13 by thermal press using a roll emboss device. A transparent reflective layer with a film thickness of about 50 nm, which contains zinc sulfide, is formed by evaporation-deposition on this diffraction structure Under the above-described conditions, a second hologram transfer foil including no hidden information is fabricated.

Next, an image display element 300 is fabricated by the following method.

To begin with, as a substrate 31, a polyethylene terephthalate film with a thickness of about 25 μm is prepared. A peeling layer 32 and an image receiving layer 35 are formed in the named order on the substrate 31 by using a lip coater. A multilayer structure of the substrate 31, peeling layer 32 and image receiving layer 35 is dried in an oven. As the material of the peeling layer 32, an acrylic resin is used. As the material of the image receiving layer 35, acrylpolyol is used. The film thicknesses of the dried peeling layer 32 and image receiving layer 35 are about 1.2 μm and 1.0 respectively.

Next, by performing thermal transfer of the first and second hologram transfer foils by using a thermal head of about 300 dpi, the heat-conductive hidden information possession portion H2 and heat-conductive hidden information non-possession portion H1 are transferred, respectively, from the substrate 11 to the image receiving layer 35.

As illustrated in FIG. 7, the fabrication of the image display element 300 includes forming, at first, the transfer layer 310 corresponding to the heat-conductive hidden information possession portion H2 so as to fill the entire surface of a predetermined transfer range, and then forming the transfer layer 320 of the heat-conductive hidden information non-possession portion H1 by performing transfer such that the identification information (face image) with an intermediate gradation for personal authentication is disposed at the heat-conductive hidden information non-possession portion H1.

As illustrated in FIG. 9, when the personal authentication medium 400 fabricated under the above conditions is observed at an observation angle corresponding to the spatial frequency of about 1000/mm, the identification image 420 shown in FIG. 10A is confirmed, while the hidden information shown in FIG. 10B is not observed.

On the other hand, when the personal authentication medium 400 is observed at an observation angle corresponding to the spatial frequency of about 2000/mm, diffraction light of the heat-conductive hidden information possession portion H2 is emitted, and the hidden information 410 shown in FIG. 10B is confirmed while the identification image 420 shown in FIG. 10A is not observed.

The above-described embodiments and examples have been presented by way of example only, and are not intended to limit the scope of the invention. The embodiments and examples may be embodied in a variety of other forms, and various omissions, substitutions and changes may be made without departing from the spirit of the inventions. The above-described embodiments and examples, and their modifications, are included in the scope and spirit of the invention, and included in the accompanying claims and their equivalents.

INDUSTRIAL APPLICABILITY

The present invention is used in fields in which counterfeiting and tampering of personal authentication media, for instance, a booklet such as a passport or a visa, or a card, is made difficult.

What is claimed is:

1. A hologram transfer foil which is thermally transferrable to a transfer base member, comprising:
    a structure configured such that a peeling layer, a diffraction structure forming layer and an adhesive layer are stacked on one surface of a substrate,
    wherein the diffraction structure forming layer includes fine concaves and convexes forming a hologram or a diffraction grating,
    at least one of the peeling layer and the adhesive layer includes heat-conductive hidden information in a heat-conductive hidden information possession portion of the hologram transfer foil and includes identification information in a heat-conductive hidden information non-possession portion of the hologram transfer foil, and the diffraction structure forming layer is configured such that at least one of a spatial frequency of the fine concaves and convexes and a grating angle of the fine concaves and convexes is different between a first portion of the diffraction structure forming layer located in the heat-conductive hidden information possession portion and a second portion of the diffraction structure forming layer in the heat-conductive hidden information non-possession portion.

2. The hologram transfer foil of claim 1, wherein the heat-conductive hidden information is a geometrical pattern, a cyclically arranged two-value character pattern, or a cyclically arranged two-value graphic pattern.

3. The hologram transfer foil of claim 1, wherein the at least one of the peeling layer and the adhesive layer records the heat-conductive hidden information in the heat-conductive hidden information possession portion by forming concaves and convexes.

4. The hologram transfer foil of claim 1, wherein the heat-conductive hidden information is recorded in the heat-conductive hidden information possession portion by an agglomeration state of an inclusion in the adhesive layer.

5. A hologram transfer foil which is thermally transferrable to a transfer base member, comprising:
   a structure configured such that a peeling layer, a diffraction structure forming layer and an adhesive layer are stacked on one surface of a substrate,
   wherein the diffraction structure forming layer includes fine concaves and convexes of forming a hologram or a diffraction grating,
   at least one of the peeling layer and the adhesive layer includes heat-conductive hidden information in a heat-conductive hidden information possession portion, and includes no hidden information in a heat-conductive hidden information non-possession portion, and
   the diffraction structure forming layer is configured such that at least one of a spatial frequency of the fine concaves and convexes and a grating angle of the fine concaves and convexes is different between a first portion of the diffraction structure forming layer located in the heat-conductive hidden information possession portion and a second portion of the diffraction structure forming layer in the heat-conductive hidden information non-possession portion.

6. A fabrication method of an image display element in which the hologram transfer foil of claim 5 is thermally transferred to the transfer base member, comprising:
   transferring the heat-conductive hidden information possession portion of the hologram transfer foil onto the transfer base member; and
   transferring the heat-conductive hidden information non-possession portion of the hologram transfer foil onto the transfer base member, the heat-conductive hidden information non-possession portion including identification information.

7. An image display element fabricated by the fabrication method of claim 6, wherein the image display element includes a structure configured such that an image receiving layer, an adhesive layer, a diffraction structure forming layer and a peeling layer are stacked on one surface of a substrate.

8. A personal authentication medium comprising the image display element of claim 7.

9. A hologram transfer foil which is thermally transferrable to a transfer base member, comprising:
   a structure configured such that a peeling layer, a diffraction structure forming layer and an adhesive layer are stacked on one surface of a substrate,
   wherein the diffraction structure forming layer includes fine concaves and convexes forming a hologram or a diffraction grating,
   at least one of the peeling layer and the adhesive layer includes heat-conductive hidden information that is non-personal information in a heat-conductive hidden information possession portion, and includes identification information for personal authentication in a heat-conductive hidden information non-possession portion,
   the heat-conductive hidden information is recognizable at a visual recognition angle that is different from a visual recognition angle of the identification information, and
   the diffraction structure forming layer is configured such that at least one of a spatial frequency of the fine concaves and convexes and a grating angle of the fine concaves and convexes is different between a first portion of the diffraction structure forming layer located in the heat-conductive hidden information possession portion and a second portion of the diffraction structure forming layer in the heat-conductive hidden information non-possession portion.

* * * * *

UNITED STATES PATENT AND TRADEMARK OFFICE
CERTIFICATE OF CORRECTION

PATENT NO. : 9,557,710 B2
APPLICATION NO. : 14/518368
DATED : January 31, 2017
INVENTOR(S) : Masami Inokuchi

Page 1 of 1

It is certified that error appears in the above-identified patent and that said Letters Patent is hereby corrected as shown below:

In the Claims

Column 13, Line 30 (Approx.) (Claim 5, Line 7), after "convexes" delete "of"

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*